3,000,833
COLOR SALTS OF FLUOREN-9-OLS AS INFRARED ABSORBERS

Ralph A. Coleman, Middlesex, and Peter V. Susi, Somerville, N.J., assignors to American Cyanamid Company, New York, N.Y., a corporation of Maine
No Drawing. Filed Jan. 26, 1959, Ser. No. 788,738
5 Claims. (Cl. 252—300)

This invention relates to a method of increasing the infrared absorption of materials and of protecting materials from incident infrared rays by interposing a barrier containing an infrared absorber between the source of said rays and the material to be protected. Further, it relates to a method of increasing the infrared absorption of materials by incorporating therein salts of 9-phenylfluoren-9-ols of the formula:

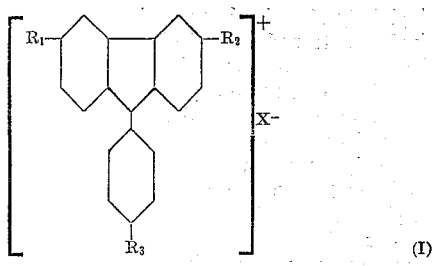

(I)

in which $R_1$, $R_2$ and $R_3$ are $NH_2$, H, $OCH_3$ or dialkylamino, at least two being $NH_2$ or dialkylamino and X is an anion and in which one or more of the aromatic hydrogens may be replaced by alkyl, alkoxy, halogen, nitro, acetamido, acetyl, or sulfonamido radicals.

The radiant energy from the sun can be divided into three regions, the near-ultraviolet, the visible and the near-infrared. Together these three regions cover the range of wave-lengths from 0.290 micron to about 4.0 microns. Somewhat arbitrarily, the near-ultraviolet spectrum may be considered to cover the region of 0.300–0.400 micron, the visible spectrum, the region of 0.400–0.700 micron; and the near-infrared spectrum, the region of 0.700–5.0 microns.

The heat from the sun is essentially due to the near-infrared radiant energy. Other high temperature bodies, such as tungsten filaments, fluorescent lamps, carbon arcs, etc., also radiate energy in the near-infrared region. Glass absorbs radiations of wavelength greater than 5.0 microns.

For practical purposes, the near-infrared spectrum may be defined as falling between 0.7 and 5.0 microns, as this is the area where the common sources of infrared radiation emit substantially all of their infrared energy. Over half of the total radiation energy emitted by the sun or electrical lamps lies in the near-infrared region.

TABLE I
*Approximate distribution of radiant energy from several energy sources*

| | Percent of Total Radiant Energy Emitted | | | |
|---|---|---|---|---|
| | .3–.4μ | .4–.7μ | .6–1.6μ | Above .7μ |
| Sunlight (reaching earth) | 5 | 42 | 54 | 53 |
| Tungsten Lamp, 500 w | 0.1 | 10 | 53 | 90 |
| Fluorescent Lamp | 5 | 35 | 28 | 60 |
| Carbon Filament Heater | | 1 | 28 | 71 |
| Nonluminous Heater | 0 | 1.5 | 1.3 | 97 |

TABLE II
*Approximate distribution of radiant energy of sunlight*

| Region | Percent of Total | Percent of Infrared |
|---|---|---|
| 0.3–0.4μ | 5 | |
| 0.4–0.7μ | 42 | |
| 0.7–1.0μ | 23 | 43.5 |
| 1.0–1.3μ | 12 | 22.5 |
| 1.3–1.6μ | 4.5 | 8.5 |
| 1.6–1.9μ | 4.5 | 8.5 |
| 1.9–2.7μ | 5 | 9.5 |
| 2.7–up μ | 4 | 7.5 |

From the above tables it may be seen that within the near-infrared region, the greatest amount of infrared energy is radiated close to the visible spectrum; i.e., 0.7 to 2.0 microns. For sunlight, 2/3 of the infrared energy comes between 0.7 and 1.3 microns. Thus, it may be seen that a large portion of the energy transmitted by our common light sources serves no useful purpose with respect to illumination, but contributes to the development of heat in the material receiving the radiation.

In many circumstances it will be desirable to filter out the nonvisible radiations of the near-infrared region of the spectrum without materially diminishing the visible radiations. There are many potential applications for materials that will transmit visible radiations and, at the same time, be opaque to heat-producing infrared radiation, particularly in the near-infrared region of 0.7–1.3 microns. Among such possible applications may be mentioned windows, sun glasses, welders' goggles and other eye protective lenses, television filters, projection lenses, etc.

One major potential application of infrared absorbers is in plastics. Many plastics absorb large amounts of radiation above 2.5 or 3.0 microns, but this is not the region of the spectrum where there is the greatest need for infrared absorbing materials. With glasses, the best and usual additive is found to be ferrous oxide although other metal oxides have been used. With an organic compound, however, such materials are unusable. An organic compound, such as a plastic, needs material which has other properties, the most important of which is compatibility. The infrared absorber for a plastic must be colorless and stable and should absorb strongly in the near-infrared in addition.

Another use in which there is a need for materials which will absorb infrared light, is in those cases in which it is desirable to increase the infrared absorption of a material. One such situation is in the case of inks. It has become quite common to use infrared sensitive paper to copy written typewritten documents in order to save valuable secretarial time. This use is carried out by exposing the document to be copied in juxtaposition to infrared sensitive paper, to infrared light. At the point where the printing or writing occurs on the paper, an increase in infrared absorption causes the reproduction of the writing on the infrared sensitive paper. However, it has been found that the average ink using synthetic dyes does not reproduce well in this process. Only those inks which are based on carbon black have been found readily reproducible. There is thus a need for a material which may be incorporated in the ordinary ink which will increase the infrared absorption and thus permit the easy copying by infrared sensitive paper of documents written with such ink.

We have found that the class of 9-phenylfluoren-9-ol salts described below have the property of absorbing infrared light in the proper range and dispersing the absorbed energy in the far infrared, and that the use of these fluorenol salts to protect other materials from deterioration by infrared light and the use of them to increase the infrared absorption of materials containing them is especially advantageous.

The fluoren-9-ol salts of this invention are related by structure and radiation absorbing properties to the basic triphenylmethane dyes. This correlation is shown in the following two formulae, with Formula II representing malachite green and Formula III representing the corresponding fluoren-9-ol salt of this invention.

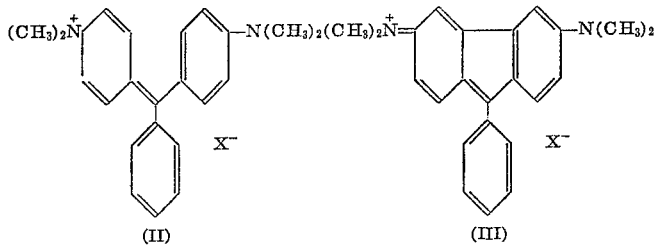

Both compounds are shown in one of their possible resonant states, a quinoid structure. The basic triphenylmethane dyes absorb strongly in the visible range of the spectrum while the fluoren-9-ol salts absorb less strongly in the visible range, and more strongly in the near-infrared region.

The 9-phenylfluoren-9-ol compounds of this invention are prepared by methods based on procedures previously disclosed for these compounds or related compounds. The primary product is the color base of the following formula

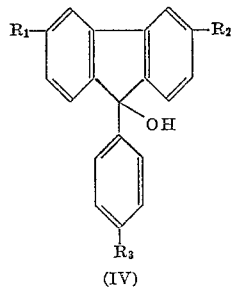

In a manner similar to that for the basic triphenylmethane dyes, the fluoren-9-ol color bases on solution in or reaction with acids produce the so-called color salts (Formula I above) which absorb in the near-infrared region and/or visible range of the spectrum.

The following compounds may be mentioned as examples of the fluoren-9-ols contemplated for use in our invention: 3,6 - bis(dimethylamino)-9-phenylfluoren-9-ol, 3,6 - bis(dimethylamino)-9-(p-dimethylaminophenyl)fluoren-9-ol, 3-dimethylamino - 9 - (p-dimethylaminophenyl)fluoren-9-ol, 3,6 - bis(dimethylamino)-9-(p-methoxyphenyl)fluoren-9-ol and 3,6-bis(dimethylamino) - 9 - (2-methoxy-5-bromophenyl)fluoren-9-ol.

Among the salts of the fluoren-9-ols usable in our invention are the chloride, oxalate, tetrachloro, zincate, acetate, bromide, sulfate, trihaloacetate (trichloroacetate, tribromoacetate), aromatic sulfonate, aliphatic sulfonate, and phosphomolybdate.

In the use of a compound to be interposed between the source of infrared light and a material to protect the latter from that light, one may use a barrier consisting of any organic solid material in which the salt of the 9-phenylfluoren-9-ol is compatible. Such materials include any of the translucent plastics materials. The material, usually will be translucent to visible light since usually coincident with protection from infrared light it is also desirable that visible light pass through to the material being protected. This, however, is not always necessary since it is sometimes desirable to protect a material which is sensitive to infrared and still have no desire to let visible light fall upon it. In such a case the barrier may be opaque to visible light. Usually, however the barrier will be translucent to visible light.

As barriers, one may especially mention the various plastic materials such as the cellulose esters, including cellulose nitrate, cellulose acetate and the like; regenerated cellulose, cellulose ethers as for example, ethyl and methyl cellulose; the polystyrene plastics, such as polystyrene itself, polymers of ring substituted styrenes for example, o-, m- and p-methylstyrene; vinyl polymers such as polyvinyl butyral and other acetals, polyvinyl chloride, polyvinyl acetate and its hydrolysis products, polyvinyl chlorideacetate copolymer and the like; the acrylic resins, such as, polymers and copolymers of methyl acrylate, acrylamide, methylolacrylamide, acrylonitrile and the like, the polyolefines, such as polyethylene, polypropylene and the like, polyesters and unsaturated-modified polyester resins made by the condensation of polycarboxylic acids with polyhydric phenols, modified by using unsaturated carboxylic acids and further modified by reacting the alkyd with a monomer is polymerizable vinylidine compound such as styrene and side chain substituted styrenes such as alpha, methylstyrene and ethylstyrene and the like, or ring substituted styrenes. Also, the cross-linking monomer can be an allyl ester of various acids.

In addition to the various plastics, the carrier may be any of a number of waxes, both natural and synthetic or of the various other thermosetting and thermoplastic opaque resins which may be used in varnishes and paints as well as in other coating materials.

In addition to the above use in barriers, the 9-phenylfluoren-9-ol salts may be incorporated in any organic material in which it is desirable to increase the infrared absorption. They also may be incorporated in aqueous and non-aqueous suspensions and solutions of coloring materials such as is used for inks, both of the normal type and of those used in ball point pens or in any other material in which it is desirable to increase the infrared absorption.

The durability of fluorenol salts in plastics is increased by the simultaneous use of compounds protecting them from ultraviolet light or by the use of an ultraviolet screen.

The usage of the fluoren-9-ol salts should be at least 0.005 gram per square foot of a barrier or of 0.01% by weight when the material is incorporated in another material to increase the infrared absorption. In incorporation in a barrier, the actual concentration of the fluoren-9-ol salt will decrease with an increase in the thickness of the barrier to give the same protection, since the total weight of fluoren-9-ol per unit area of the barrier will remain the same.

Our invention can be illustrated by the following examples in which parts are by weight unless otherwise specified and parts by volume represent the volume occupied by one part of water.

EXAMPLE 1

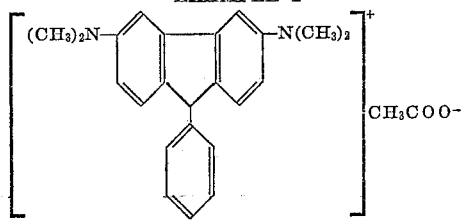

A solution of the acetate salt of 3,6-bis(dimethylamino)-9-phenylfluoren-9-ol is prepared by diluting 5 parts by volume of 0.001 molar solution of the color base in dimethylformamide to 100 parts by volume with glacial acetic acid. A yellow solution is obtained.

EXAMPLE 2

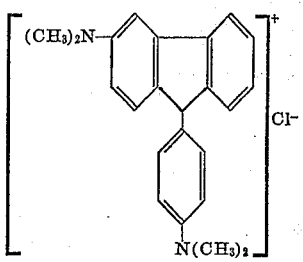

A solution of the chloride salt of 3-dimethylamino-9-(p-dimethylaminophenyl)fluoren-9-ol is prepared by diluting 5 parts by volume of a 0.001 molar solution of the color base in dimethylformamide to 100 parts by volume with dimethylformamide and approximately 3 parts by volume of 0.1 molar hydrochloric acid. This solution is weakly violet in color.

EXAMPLE 3

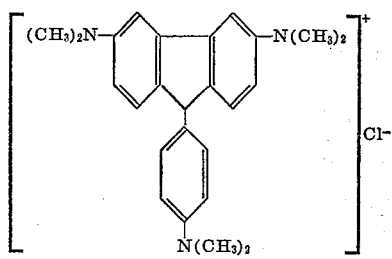

A solution of the chloride salt of 3,6-bis(dimethylamino)-9-(p-dimethylaminophenyl)fluoren-9-ol is prepared by diluting 5 parts by volume of a 0.001 molar solution of the color base in dimethylformamide to 100 parts by volume with dimethylformamide and 15 parts by volume of 1.0 molar hydrochloric acid.

EXAMPLE 4

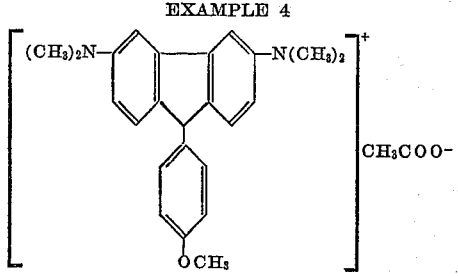

A solution of the acetate salt of 3,6-bis(dimethylamino)-9-(p-methoxyphenyl)fluoren-9-ol is prepared by diluting 5 parts by volume of a 0.001 molar solution of the color base in dimethylformamide to 100 parts by volume with glacial acetic acid. The solution is red-orange in color.

EXAMPLE 5

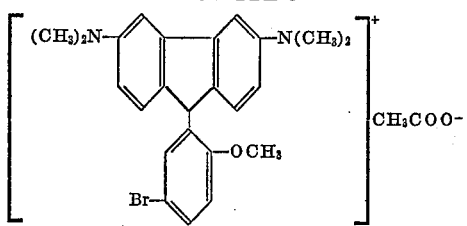

A solution of the acetate salt of 3,6-bis(dimethylamino)-9-(2-methoxy-5-bromophenyl)fluoren-9-ol is prepared by diluting 5 parts by volume of 0.001 molar solution of the color base in dimethylformamide to 100 parts by volume with glacial acetic acid. The resulting solution is yellow-red in color.

EXAMPLE 6

The spectral curves of the color salts of the fluoren-9-ols of Examples 1–5 are determined in the visual and near-infrared regions of 310 to 1700 m$\mu$. For this purpose a Spectracord, a recording spectrophotometer fitted with a near-infrared attachment and a tungsten light source, is used. The absorption peaks in the visual and near-infrared ranges are given in Table I under $\lambda_{max}$. The molecular extinction coefficient at wavelength of maximum absorption ($\epsilon_{max}$) is an expression of the degree of absorption and is calculated using the following relationship:

$$\epsilon_{max.} = -\frac{1}{bc} \log \frac{T}{T_0}$$

where $\epsilon$ is the extinction coefficient.
$b$ is the thickness of the spectrophotometer cell in centimeters.
$c$ is the concentration in gram-moles per liter.
$T$ is the amount of light passing through the solution.
$T_0$ is the amount of light passing through the solvent in the same cell.

Therefore, $\epsilon_{max.}$ is the strength of absorption based on a molar concentration of 1 gram-mole of compound per liter of solution or it may be considered a measure of absorption of each gram-mole of compound. The larger the value for $\epsilon_{max.}$, the greater is the absorption. The absorption peaks in both the visible and the near-infrared regions of the spectrum are shown in Table III.

TABLE III

| Color Salt | | Visible Region | | | |
|---|---|---|---|---|---|
| Example 1 | $\lambda_{max.}$ | 500 m$\mu$ | ---------- | 850 m$\mu$ | 950 m$\mu$ |
| | $\epsilon_{max.}$ | 20,000 | ---------- | 14,020 | 17,400 |
| Example 2 | $\lambda_{max.}$ | 472 m$\mu$ | 565 m$\mu$ | 725 m$\mu$ | 780 m$\mu$ |
| | $\epsilon_{max.}$ | 9,640 | 10,760 | 30,460 | 34,000 |
| Example 3 | $\lambda_{max.}$ | 470 m$\mu$ | 670 m$\mu$ | 850 m$\mu$ | ---------- |
| | $\epsilon_{max.}$ | 5,210 | 34,000 | 13,500 | ---------- |
| Example 4 | $\lambda_{max.}$ | 495 m$\mu$ | 525 m$\mu$ | 835 m$\mu$ | 920 m$\mu$ |
| | $\epsilon_{max.}$ | 23,740 | (1) | 12,540 | 15,600 |
| Example 5 | $\lambda_{max.}$ | 490 m$\mu$ | ---------- | 860 m$\mu$ | 960 m$\mu$ |
| | $\epsilon_{max.}$ | 13,160 | ---------- | 11,960 | 14,060 |

[1] Less than 2% transmission.

EXAMPLE 7

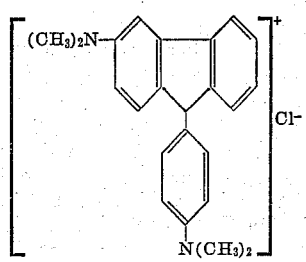

A solution of 3.29 parts (0.01 mol) of 3-dimethylamino-9-(p-dimethylaminophenyl)fluorene in 4 ml. of concentrated HCl is diluted to 500 parts by volume with water. The mixture is cooled to 0° C. and a paste of 3.0 parts (0.0125 mol) of freshly prepared lead dioxide in 4–5 parts of water is added with stirring over a 1–2 hour period. Cooling and stirring are continued for 2 hours and then 3.6 grams of sodium sulfate is added and the mixture is filtered. Sodium chloride is added to the filtrate to precipitate the color salt, the mixture cooled overnight and the product filtered off. The crude product (5.0 parts) is recrystallized from hot water.

EXAMPLE 8

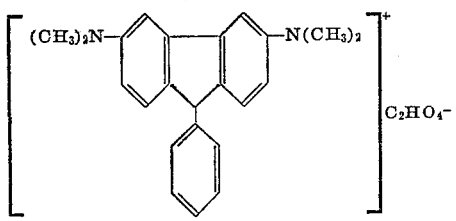

Two parts (0.00582) mol of 3,6-bis(dimethylamino)-9-phenylfluoren-9-ol is dissolved in hot solution of 1.2 parts (0.00953 mol) of oxalic acid dihydrate in 70 parts of water. To the dark colored hot solution is added 0.12 part of ammonium oxalate monohydrate in 2 parts of water. The reaction flask is placed in a large beaker of hot water and allowed to cool slowly. The dark-green product which separated is filtered off, washed with cold water, then with acetone and dried.

A solution of the above product is prepared by diluting 5 parts by volume of a 0.001 molar solution in glacial acetic acid (0.0344 part in sufficient glacial acetic acid to give 100 parts by volume) to 100 parts by volume with glacial acetic acid. The spectral curve of the solution is determined as in Example 6.

The above product (0.100 part) is milled with 100 parts of cellulose acetate using a 2-roll mill with front roll at 300° F. and back roll at 340° F. The cellulose acetate is then molded to give a "chip" of 15 mills thickness. The spectral curve of the plastic chip is determined.

The spectrascopic date obtained in these experiments is given in Table IV.

TABLE IV

| Salt | Medium | $\lambda_{max.}$ | |
|---|---|---|---|
| | | Visible Range, m$\mu$ | Near-Infrared Range, m$\mu$ |
| Acetate (Ex. 1) | Dimethylformamide | 500 | 850 and 950 |
| Oxalate | Glacial Acetic Acid | | 850 and 950 |
| Oxalate | Cellulose Acetate | 485 | 850 and 940 |

EXAMPLE 9

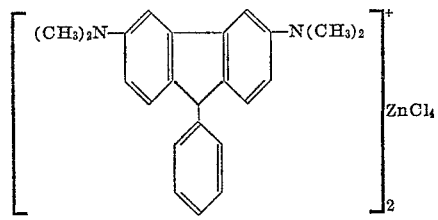

One part (0.00291 mol) of 3,6-bis(dimethylamino)-9-phenylfluoren-9-ol is dissolved in 100 parts of water and 4 parts by volume of concentrated hydrochloric acid. A solution of 1.36 parts (0.01 mol) of zinc chloride in 25 parts of water containing a small amount of concentrated hydrochloric acid is added, followed by the slow addition of a saturated sodium chloride solution. After precipitation has started, solid sodium chloride is added until almost all of the product has been salted out. After standing overnight, the dark brown product is filtered off, washed with cold water and dried.

EXAMPLE 10

Solutions of chlorzincate salts of the fluorenols shown in Table III are prepared by dissolving 0.001 mol of the respective color base in 40 parts by volume of dimethylformamide, adding this solution to 30 parts of approximately 30% solution of cellulose acetate in acetone and adding a small amount of zinc chloride. Glass microslides are dipped into the above solutions and the deposited acetate film on one side of each slide is removed by careful scraping. Absorption curves of the above cellulose acetate films are determined before and after 100 hours of exposure in a Fade-Ometer. One film for each fluorenol is exposed with a UV absorbing screen placed between the acetate film and the source of light. Another film for each fluorenol is not protected by a UV absorbing screen. The UV absorbing screen consists of a sheet of cellulose acetate having incorporated therein 2,2'-dihydroxy-4-methoxy benzophenone (Cyasorb UV 24) and transmits 50% of the light of wavelength 400 m$\mu$ with absorption of most of the light below 400 m$\mu$.

The percent of fluorenol remaining after 100 hours exposure was calculated by the formula—

$$\frac{D_{100}}{D_0} \times 100 = \text{Percent remaining}$$

where $D_0$ and $D_{100}$ are the optical densities of the absorption peak at the longest wave length at 0 hour and 100 hours, respectively. The results are shown in Table V.

TABLE V

| Salt of— | Percent Remaining after 100 Hours | |
|---|---|---|
| | Protected by UV Screen | Unprotected |
| 3,6-bis(dimethylamino)-9-phenylfluoren-9-ol | 80.3 / 58.3 | 36.5 / 36.5 / 32.6 |
| 3-dimethylamino-9-(p-dimethylaminophenyl)-fluoren-9-ol | 94.4 / 92.8 | 37.6 / 40.4 |
| 3,6-bis(dimethylamino)-9-(p-dimethylaminophenyl)fluoren-9-ol | 74.8 / 75.9 | 32.2 / 34.3 |

EXAMPLE 11

There is milled into 50 parts of said cellulose acetate 0.001 part of the isolated salt of Example 9. A plastic chip, 15 mls. in thickness is molded. This molded material shows an absorption peak 850 millicrons.

EXAMPLE 12

The procedure of Example 11 is followed using polyvinyl chloride instead of cellulose acetate.

EXAMPLE 13

The procedure of Example 11 is followed using polystyrene in place of the cellulose acetate.

EXAMPLE 14

The procedure of Example 11 is followed using polyethylene in place of the cellulose acetate.

EXAMPLE 15

The product of Example 9 is dispersed in an equal weight of mineral oil. This, on use as an ink, reproduces well when a heat sensitive reproductive paper is placed in contact with a paper bearing writing in the above ink and exposed to infrared light.

We claim:

1. A method of increasing the infrared absorption of materials which comprises incorporating therein at least 0.01% by weight of a salt of a 9-phenyl-fluoren-9-ol of the structure:

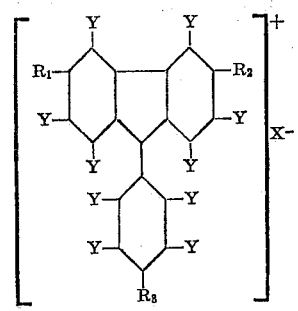

in which $R_1$, $R_2$ and $R_3$ are selected from the group consisting of H, $OCH_3$, $NH_2$ and dialkylamino, at least two of such R's being selected from the group consisting of $NH_2$ and dialkylamino, the Y's being each selected from the group consisting of hydrogen, alkyl, alkoxy, halogen, nitro, acetamido, acetyl and sulfonamido and X is an anion.

2. A method of protecting materials from incident infrared rays which comprises interposing between the source of said infrared rays and the material to be protected, a barrier containing at least 0.005 gram per square foot of barrier of a salt of a 9-phenylfluoren-9-ol of the structure:

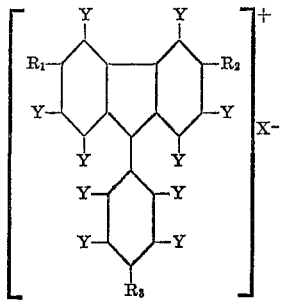

in which $R_1$, $R_2$ and $R_3$ are selected from the group consisting of H, $OCH_3$, $NH_2$ and dialkylamino, at least two of such R's being selected from the group consisting of $NH_2$ and dialkylamino, the Y's being each selected from the group consisting of hydrogen, alkyl, alkoxy, halogen, nitro, acetamido, acetyl and sulfonamide and X is an anion.

3. The method of claim 2 in which the said barrier is an organic solid.

4. The method of claim 3 in which the salt of a fluorenol is the zinc chloride salt of 3,6-dimethylamino-fluoren-9-ol.

5. The method of claim 3 in which the salt of a fluorenol is the oxalate of 3,6-dimethylamino-fluoren-9-ol.

References Cited in the file of this patent
UNITED STATES PATENTS
1,091,443    Ruth _____ Mar. 24, 1914